Figures 1, 3:
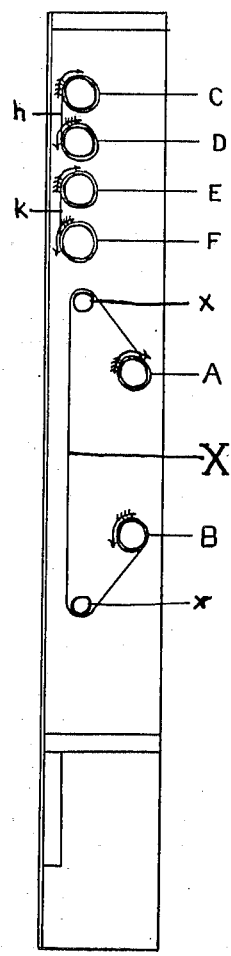

A. J. KELLY.
PERPETUAL CALENDAR.
APPLICATION FILED JULY 28, 1911.

1,053,610.

Patented Feb. 18, 1913.

2 SHEETS—SHEET 1.

A. J. KELLY.
PERPETUAL CALENDAR.
APPLICATION FILED JULY 28, 1911.

1,053,610.

Patented Feb. 18, 1913.

2 SHEETS—SHEET 2.

FIG. 2.

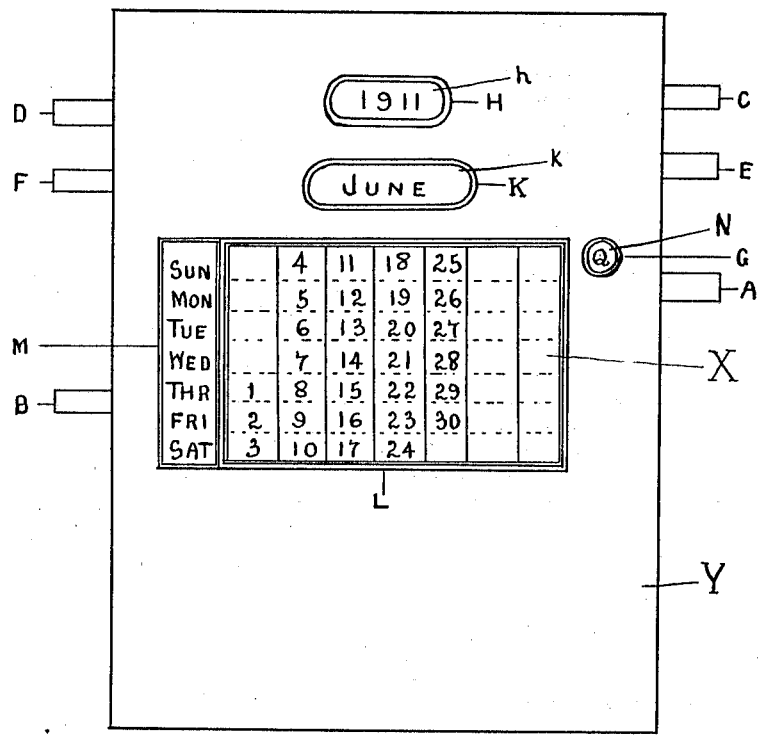

FIG. 4.

| YEAR | JAN. | FEB. | MAR. | APR. | MAY. | JUNE. | JUL. | AUG. | SEP. | OCT. | NOV. | DEC. |
|---|---|---|---|---|---|---|---|---|---|---|---|---|
| 1911 | N | C | K | H | M | Q | O | L | I | N | R | P |
| 1912 | M | B | P | T | K | H | M | J | U | L | I | N |
| 1913 | K | G | O | S | J | U | L | P | T | K | H | M |
| 1914 | J | F | N | R | P | T | K | O | S | J | U | L |
| 1915 | P | E | M | Q | O | S | J | N | R | P | T | K |
| 1916 | O | D | K | H | M | Q | O | L | I | N | R | P |
| 1917 | M | B | J | U | L | I | N | K | H | M | Q | O |
| 1918 | L | A | P | T | K | H | M | J | U | L | I | N |
| 1919 | K | G | O | S | J | U | L | P | T | K | H | M |
| 1920 | J | F | M | Q | O | S | J | N | R | P | T | K |
| 1921 | O | D | L | I | N | R | P | M | Q | O | S | J |
| 1922 | N | C | K | H | M | Q | O | L | I | N | R | P |

Witnesses.
Frederick Loasby
William Smith Jackson,

Inventor.
Arthur James Kelly.

UNITED STATES PATENT OFFICE.

ARTHUR JAMES KELLY, OF LONDON, ENGLAND.

PERPETUAL CALENDAR.

1,053,610.  Specification of Letters Patent.  Patented Feb. 18, 1913.

Application filed July 28, 1911. Serial No. 641,073.

*To all whom it may concern:*

Be it known that I, ARTHUR JAMES KELLY, a citizen of Great Britain, residing at 57 Queen Margaret's Grove, Islington, London, in the county of Middlesex and Kingdom of England, have invented a new and useful Improvement in Perpetual Calendars, of which the following is a specification, reference being had to the accompanying four drawings, forming part of same.

My invention consists of certain new and useful improvements in calendars, and the principal object which I have in view is to provide a perpetual calendar wherein an entire month for any year is made visible, with the correct number of days only for that specific month, that is, if a month has only twenty-eight days that number of days would be shown, and not thirty or thirty-one days. To provide for this construction I employ a code which may be secured to any part of the calendar and also a code key, for use in connection therewith. In addition to showing only the correct number of days in any month, the calendar indicates the days of the week and month in any year.

In the device as illustrated and described, I have worked out a code for twelve years but the same results can be obtained for any number of years.

In the accompanying drawings, Figure 1 is a front view of a sheet containing indications for the days of the month and code key. Fig. 2 is a front view of the calendar with openings for the indications of the days of the week, month and year. Fig. 3 is a sectional side view of Fig. 2. Fig. 4 is a view of the code sheet extending over a period of twelve years.

As heretofore stated, my improved calendar is perpetual in its character, and is designed to display any entire month at a glance. The days of the week, shown in this instance as running from Sunday to Saturday are placed in a fixed position upon the face of the calendar as at M, Fig. 2.

The figures indicating the days of the month are arranged on a sheet of suitable material as X in seven vertical and thirty-three horizontal columns and as shown in Fig. 1, and at one end of the horizontal columns one to seven, and from fourteen to twenty-seven, are placed alphabetical letters commencing at A and ending with U, as also clearly shown in Fig. 1 at N. These alphabetical letters form the code key by means of which the code sheet, Fig. 9, may be read, as hereinafter set forth.

The sheet X extends over idle pulleys $x\ x$ and is moved by means of rollers A, B to which its ends are secured. To move the sheet X upward the roller A is turned, and to move the same downward the roller B is rotated. By this means the sheet X may be adjusted to any position and any desired part thereof exhibited through the aperture L in the main portion Y of the calendar and the code key letters N are also exhibited one at a time through the aperture G.

A year sheet $h$ provided with the desired number of year designations is mounted upon and movable by the rollers C, D and exhibited through the opening H in the calendar.

A month sheet $k$ is mounted upon and movable by rollers E, F in a manner similar to sheet $h$ and is provided with the names of the months which are visible in rotation through the aperture K.

To ascertain the days of a desired month for a particular year the sheet X is moved by its operating means until the proper code key letter for the particular year corresponding to the sheet is exhibited through the aperture G. Thus if it is desired to show the month of June for 1911, the sheet X is moved until the code key letter Q having its corresponding letter in the horizontal column of 1911 in the code sheet under June is visible through the aperture G, when the calendar for the desired month will be displayed, it being understood that the year sheet and month sheet will also be suitably adjusted.

What I claim and desire to secure by Letters Patent is:—

1. A calendar comprising a main portion provided with a plurality of apertures, a list of the days of the week provided upon said main portion adjacent to one of said apertures, a sheet provided with a plurality of columns of figures designating the days of the months for any number of years and a code key column containing indications adapted to be used in connection with a code, said sheet having thirty-three horizontal rows of figures and the indications in the code column being adjacent to the first seven rows and also adjacent to the fourteenth to twenty-seventh rows inclusive, means for moving said sheet to exhibit a desired indication in the code key column through one of said apertures and the corresponding portion of the sheet containing the exact number of days for the desired month through the other aperture, and indications for the year and name of the month.

2. A calendar comprising a main portion provided with a plurality of apertures, a list of the days of the week provided upon said main portion adjacent to one of said apertures, a sheet provided with a plurality of columns of figures designating the days of the months for any number of years and a code key column containing indications adapted to be used in connection with a code, said sheet having thirty-three horizontal rows of figures and the indications in the code column being adjacent to the first seven rows and also adjacent to the fourteenth to twenty-seventh rows inclusive, rollers upon which said sheet is mounted, said rollers being adapted to move said sheet to exhibit a desired indication in the code key column through one of said apertures and the corresponding portion of the sheet through the other aperture, a movable year indication sheet and a movable month indication sheet.

ARTHUR JAMES KELLY.

Witnesses:
FREDERICK LOASBY,
WILLIAM SMITH JACKSON.